United States Patent [19]

Niijima

[11] Patent Number: 5,155,840
[45] Date of Patent: Oct. 13, 1992

[54] SINGLE-CHIP MIRCOCOMPUTER WITH CLOCK-SIGNAL SWITCHING FUNCTION WHICH CAN DISABLE A HIGH-SPEED OSCILLATOR TO REDUCE POWER CONSUMPTION

[75] Inventor: Shinji Niijima, Tokyo, Japan
[73] Assignee: NEC Corporation, Tokyo, Japan
[21] Appl. No.: 669,192
[22] Filed: Mar. 14, 1991

[30] Foreign Application Priority Data

Mar. 16, 1990 [JP] Japan ................................ 2-66566

[51] Int. Cl.⁵ ........................... G06F 1/00; G04G 7/00
[52] U.S. Cl. ............................. 395/550; 364/DIG. 1; 364/273.1; 364/270.3; 364/271.0; 364/DIG. 2; 364/948.8
[58] Field of Search ................ 395/550, 750; 364/707

[56] References Cited

U.S. PATENT DOCUMENTS

| | | | |
|---|---|---|---|
| 4,322,580 | 3/1982 | Khan et al. | 395/550 |
| 4,545,030 | 10/1985 | Kitchin | 395/550 |
| 4,694,393 | 9/1987 | Hirano et al. | 364/200 |
| 4,707,142 | 11/1987 | Baren et al. | 368/46 |
| 4,727,491 | 2/1988 | Callby | 395/550 |
| 4,821,229 | 4/1989 | Jaurequi | 395/550 |
| 4,981,296 | 1/1991 | Snimishi et al. | 395/550 |
| 5,059,925 | 10/1991 | Weisbloom | 331/1 A |
| 5,077,734 | 12/1961 | Ohtsuka | 370/100.1 |

Primary Examiner—Dale M. Shaw
Assistant Examiner—Robert S. Hauser
Attorney, Agent, or Firm—Whitham & Marhoefer

[57] ABSTRACT

A single-chip microcomputer has a clock-signal generating circuit which includes a main system-clock oscillation circuit for generating a main clock-signal, a sub system-clock oscillation circuit for generating a sub clock-signal, a selector flag setter for setting a selector flag, an oscillation control flag setter for setting an oscillation control flag, and a synchronization control circuit for effecting synchronization between the main clock-signal and the sub clock-signal. The clock-signal generating circuit of the invention has a logic circuit which takes a logical AND operation of outputs of the oscillation control flag setter, the selector flag setter and the synchronization control circuit and which outputs an oscillation control signal for stopping oscillating operation of the main system-clock oscillation circuit. The main system-clock oscillation circuit automatically stops upon completion of the clock-signal switching operation, so that a CPU does not require a stand-by period for the switching of clock-signals and this results in the enhancement of processing capability of the CPU and results in the reduction of the power consumption.

2 Claims, 3 Drawing Sheets

5,155,840

SINGLE-CHIP MIRCOCOMPUTER WITH CLOCK-SIGNAL SWITCHING FUNCTION WHICH CAN DISABLE A HIGH-SPEED OSCILLATOR TO REDUCE POWER CONSUMPTION

BACKGROUND OF THE INVENTION

The present invention relates to a single-chip microcomputer which possesses internally a clock-signal switching function and, more particularly, to a single-chip microcomputer capable of automatically stopping the oscillation of a main system-clock oscillation circuit after a clock signal has been switched to a sub clock-signal from a main clock-signal.

Today, one of the capabilities which is sought in a single-chip microcomputer is that of reducing power consumption.

A conventional example in which an attempt has been made to reduce power consumption is one which employs two oscillators, one being a main system-clock oscillator for a high speed operation and the other being a sub system-clock oscillator for a low speed operation.

In this conventional example, during the period in which the single-chip microcomputer is operable by the clock-signal for a low speed operation, the main system-clock oscillation circuit stops its operation and only the sub system-clock oscillation circuit which is slow in speed but in which the power consumption is small operates. Such a conventional single-chip microcomputer and a problem therein are fully explained later for assisting the understanding of the present invention.

SUMMARY OF THE INVENTION

It is, therefore, an object of the present invention to overcome the problem existing in the conventional arrangement and to provide an improved single-chip microcomputer.

It is another object of the present invention to provide a single-chip microcomputer which is capable of effecting an automatic stop of a main system-clock oscillation circuit after a main clock-signal has been switched to a sub clock-signal.

In carrying out the above and other objects of the present invention in one form, there is provided a single-chip microcomputer provided with a clock-signal generating circuit having:

a main system-clock oscillation circuit and a sub system-clock oscillation circuit;

a selector for outputting a clock-signal by making a selection between a main clock-signal which is an output of the main system-clock oscillation circuit and a sub clock-signal which is an output of the sub system-clock oscillation circuit;

a selector flag setter for setting a selector flag signal to designate the selection to be made by the selector;

an oscillation control flag setter for setting an oscillation control flag signal to control the oscillating operation of the main system-clock oscillation circuit;

a synchronization control circuit for making the synchronization between the main clock-signal and the sub clock-signal and outputting a synchronization signal; and a means for taking a logical AND operation of the oscillation control flag signal from the oscillation control flag setter, the selector flag signal from the selector flag setter and the synchronization signal from the synchronization control circuit and outputting an oscillation control signal for stopping the oscillating operation of the main system-clock oscillation circuit.

In the single-chip microcomputer according to the present invention, when the main system-clock oscillation circuit is to be stopped after the clock-signal has been switched to the sub clock-signal from the main clock-signal, it is possible for the main system-clock oscillation circuit to stop automatically after the completion of the switching from the main to sub clock-signal. Therefore, the central processing unit (hereinafter referred to as "CPU") can execute an instruction for stopping the oscillating operation of the main system-clock oscillation circuit immediately after the instructions for switching of clock signals and it does not require a stand-by period for the switching of clock-signals and this results in the enhancement of processing capability of the CPU.

BRIEF DESCRIPTION OF THE DRAWINGS

The above and other objects, features and advantages of the present invention will be apparent from the following description of a preferred embodiment according to the present invention explained with reference to the accompanying drawings, in which.

PREFERRED EMBODIMENT OF THE INVENTION

Throughout the following explanation, similar reference symbols or numerals refer to the same or similar elements in all the figures of the drawings.

For the purpose of assisting in the understanding of the present invention, a conventional single-chip microcomputer is first described with reference to FIGS. 2 and 3 before the present invention is explained.

Figure 2:
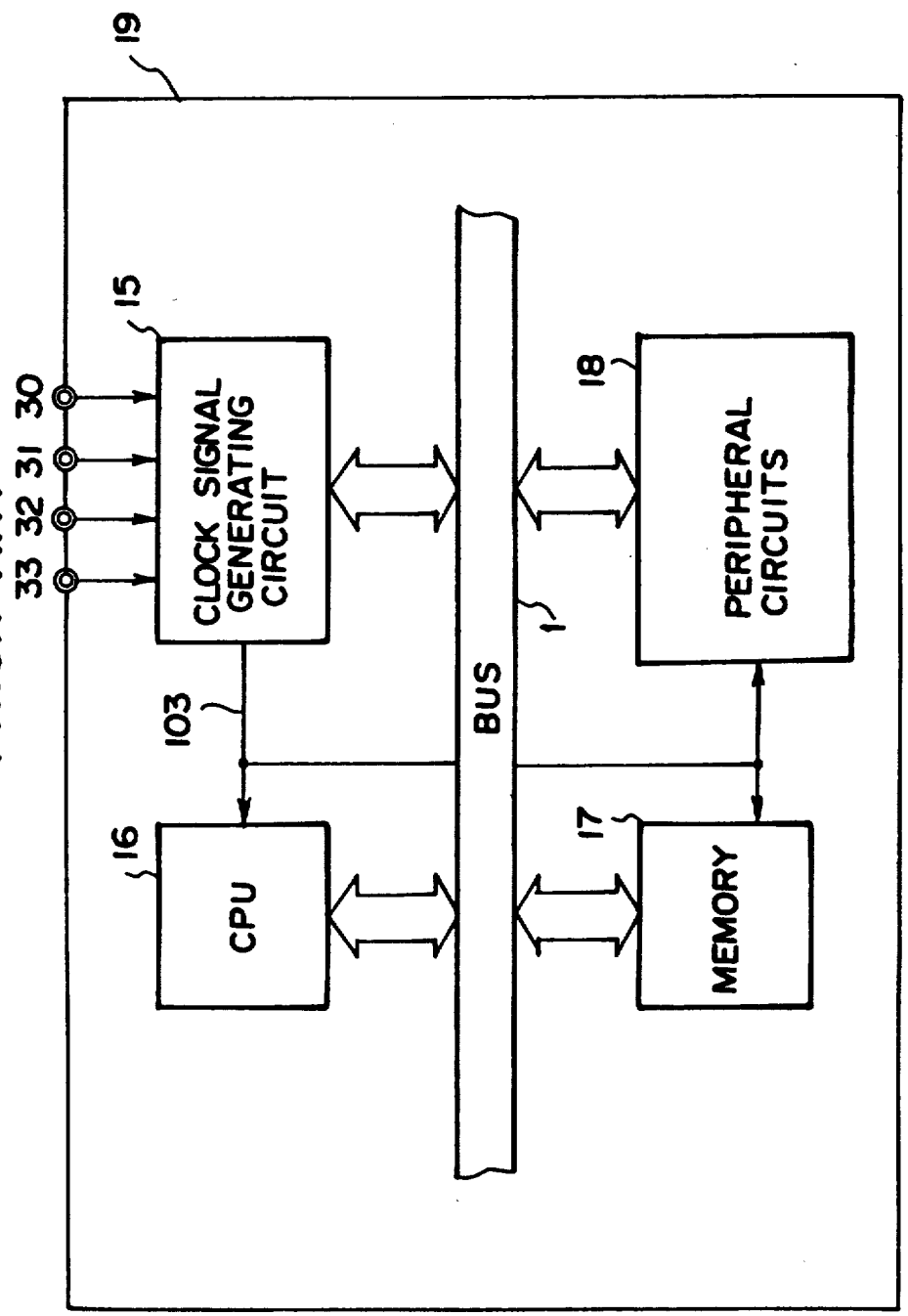
FIG. 2 is a block diagram showing a prior art single-chip microcomputer.

FIG. 2 is a block diagram showing a conventional single-chip microcomputer 19 which has a clock-signal switching function.

The conventional single-chip microcomputer 19 shown in FIG. 2 comprises an internal bus 1, a clock-signal generating circuit 15, a CPU 16, a memory unit 17, peripheral circuits 18, and external terminals 30, 31, 32 and 33.

The CPU 16 reads out programs from the memory unit 17, executes instructions and stores the processed data in the memory unit 17. The clock-signal generating circuit 15 has crystal oscillators connected respectively to the external terminals 30, 31, 32 and 33 and generates system-clock signals to be supplied to the CPU 16, the peripheral circuits 18 and the memory unit 17. A clock-signal 103 is a signal for transferring the system-clock signals generated by the clock-signal generating circuit 15 and is supplied to the CPU 16, the peripheral circuits 18 and the memory unit 17.

Figure 3:
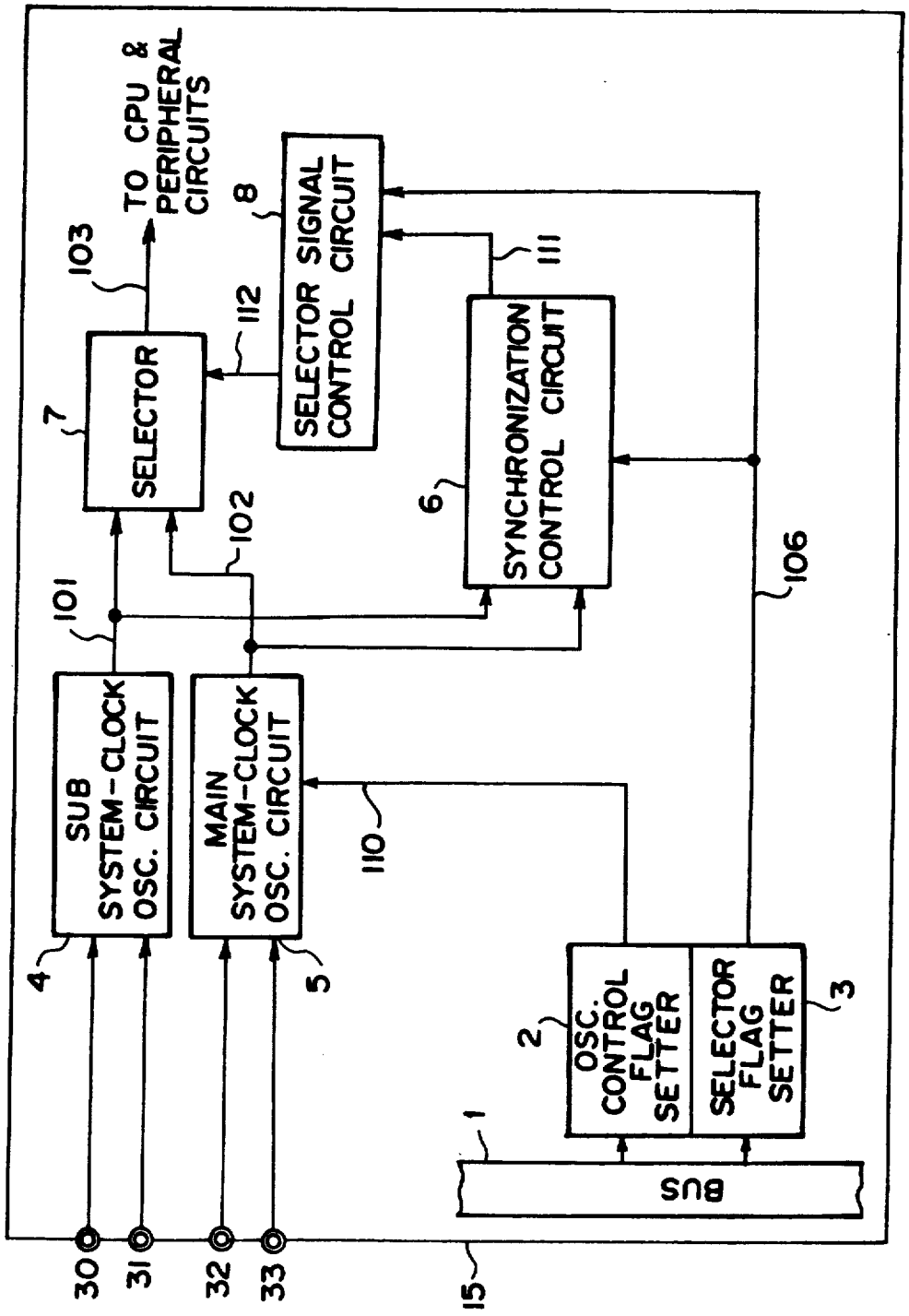
FIG. 3 is a block diagram showing a clock-signal generating circuit in the prior art single-chip microcomputer shown in FIG. 2.

FIG. 3 is a block diagram showing details of the clock-signal generating circuit 15 in the microcomputer shown in FIG. 2.

Hereinafter the configuration and the operation of the clock-signal generating circuit 15 are explained with reference to FIG. 3.

The clock-signal generating circuit 15 shown in FIG. 3 comprises an internal bus 1, an oscillation control flag setter 2, a selector flag setter 3, a sub system-clock oscillation circuit 4, a main system-clock oscillation circuit 5, a synchronization control circuit 6, a selector 7, a selector signal control circuit 8 and external terminals 30, 31, 32 and 33. A sub clock-signal 101 is generated in the sub system-clock oscillation circuit 4 and is supplied to the selector 7 and the synchronization control circuit 6. A main clock-signal 102 is generated in the main system-clock oscillation circuit 5 and is supplied to the selector 7 and the synchronization control circuit 6. A selector flag signal 106 is a signal for transferring the contents of selector flags set in the selector flag setter 3 and is supplied to the selector signal control circuit 8 and the synchronization control circuit 6. An oscillation control signal 110 is a signal for transferring the contents of oscillation control flags set in the oscillation control flag setter 2 and is supplied to the main systemclock oscillation circuit 5. A synchronization signal 111 is outputted from the synchronization control circuit 6 and supplied to the selector signal control circuit 8. A selector signal 112 is outputted from the selector signal control circuit 8 and supplied to the selector 7. The oscillation control flags outputted from the oscillation control flag setter 2 are flags which control the starting and stopping of the oscillating operation of the main system-clock oscillation circuit 5. The main system-clock oscillation circuit 5 starts oscillation when the oscillation control flag setter 2 sets "0" in the oscillation control signal 110 and stops oscillation when the same sets "1". The selector flag setter 3 sets selector flags for selecting either one of the clock-signals. That is, the selector flag is set to "0" when the main clock-signal 102 is to be selected and is set to "1" when the sub clock-signal 101 is to be selected. The sub system-clock oscillation circuit 4 generates the sub clock-signal 101 due to the crystal oscillator connected to the external terminals 30, 31. The main system-clock oscillation circuit 5 generates the main clock-signal 102 due to the crystal oscillator connected to the external terminals 32, 33. Further, the main system-clock oscillation circuit 5 performs oscillating operation when the oscillation control signal 110 is "0" and stops such operation when the same is "1". The synchronization control circuit 6 is a circuit for controlling the synchronization of the sub clock-signal 101 and the main clock-signal 102. When the main clock-signal 102 is switched to and synchronizes with the sub clock-signal 101, the synchronization signal 111 rises from "0" to "1". On the contrary, when the sub clock-signal 101 is switched to and synchronize with the main clock-signal 102, the synchronization signal 111 falls from "1" to "0". Also, during the period in which the selector flag signal 106 is selecting the main clock-signal 102, the synchronization signal 111 holds "0" and, during the period in which the same is selecting the sub clock-signal 101, the synchronization signal 111 holds "1". The selector signal control circuit 8 receives the synchronization signal 111 and the selector flag signal 106 and outputs the selector signal 112. When the level of the synchronization signal 111 changes, that is, when the two clock-signals synchronize with each other, the content of the selector flag signal 106 is outputted as the selector signal 112. According to this selector signal 112, the selector 7 selects either one of the sub clock-signal 101 and the main clock-signal 102. When the selector signal 112 inputted to the selector 7 is "0", the main clock-signal 102 is selected and, when the same is "1", the sub clock-signal 101 is selected.

Now, the operation as to how the main system-clock oscillation circuit 5 is stopped for reducing the power consumption by switching the main clock-signal 103 to the sub clock-signal 101 is explained. First, the CPU 16 executes an instruction for setting "1" in the selector flag setter 3. Then, the synchronization control circuit 6 starts its operation and, when the main clock-signal 102 and the sub clock-signal 101 synchronize with each other, the synchronization signal 111 rises from "0" to "1". Normally the cycle of the sub clock-signal 101 is several tens of times longer as compared with that of the main clock-signal 102 and, thus, it takes several $\mu$ seconds before the two clock-signals are synchronized with each other. When the selector signal control circuit 8 detects a rise of the synchronization signal 111, it supplies the selector 7 with the selector signal 112. Since "1" has been set in the selector flag setter 3, the selector signal 112 is "1" and the selector 7 selects the sub clock-signal 101. This completes the switching of the clock-signals from the main clock signal to the sub clock signal. During the period of time required for the synchronization control circuit 6 to have the main clock-signal 102 and the sub clock-signal 101 synchronized with each other, the CPU 16 is in its stand-by state without being able to execute a stop-instruction of the main system-clock oscillation circuit 5. Only after the lapse of time in which the main clock-signal 102 is surely switched to the sub clock-signal 101 does the CPU 16 execute the instruction for setting "1" in the oscillation control flag setter 2. When "1" is set in the oscillation control flag setter 2, the main system-clock oscillation circuit 5 stops its oscillating operation.

The following explains how the main system-clock oscillation circuit 5 starts its oscillating operation.

The CPU 16 executes the predetermined instruction and "0" is set in the oscillation flag setter 2. When the oscillation control flag setter 2 is set to "0", the oscillation control signal 110 turns to "0" so that the main system-clock oscillation circuit 5 starts its oscillating operation.

When the switching is effected from the main clock-signal 102 to the sub clock-signal 101 in the conventional single-chip microcomputer having such clock-signal switching function as explained above, the CPU 16 executes the stop-instruction of the main system-clock oscillation circuit 5 only after the lapse of the time required for executing the clock-signal switching instruction and completing the switching operation. Consequently, during this period of time required, the CPU 16 is forced to be in its stand-by state without being able to execute any other instructions, resulting in a disadvantage.

The single-chip microcomputer according to the present invention has a central processing unit (CPU) and a clock-signal generating circuit 14 which includes a main system-clock oscillation circuit 5, a sub system-clock oscillation circuit 4, a selector 7 for outputting a clock-signal 103 by making a selection between a main clock-signal 102 which is an output of the main system-clock oscillation circuit 5 and a sub clock-signal 101 which is an output of the sub system-clock oscillation circuit 4, a selector flag setter 3 establishing a selector flag signal 116 for designating the selection by the selector 7, an oscillation control flag setter 2 establishing an oscillation control flag signal 105 for controlling the oscillating operation of the main system-clock oscillation circuit 5, and a synchronization control circuit 6 for effecting the synchronization between the main clock-signal 102 and the sub clock-signal 101. As one of the main features of the invention, the clock-signal generating circuit 14 also includes a means for taking a logical AND among the oscillation control flag signal 105 from the oscillation flag setter 2, the selector flag signal 116 from the selector flag setter 3 and the synchronization signal 121 from the synchronization control circuit 6 and for outputting as an oscillation control signal 120 for stopping the oscillation of the main system-clock oscillation circuit 5.

According to the present invention, the main system-clock oscillation circuit automatically stops its operation upon completion of the clock-signal switching operation, so that the stop-instruction for the main system-clock oscillation circuit 5 can be executed immediately after the clock-signal switching instruction is given.

Next, a preferred embodiment of the present invention is explained with reference to the drawings.

Figure 1:
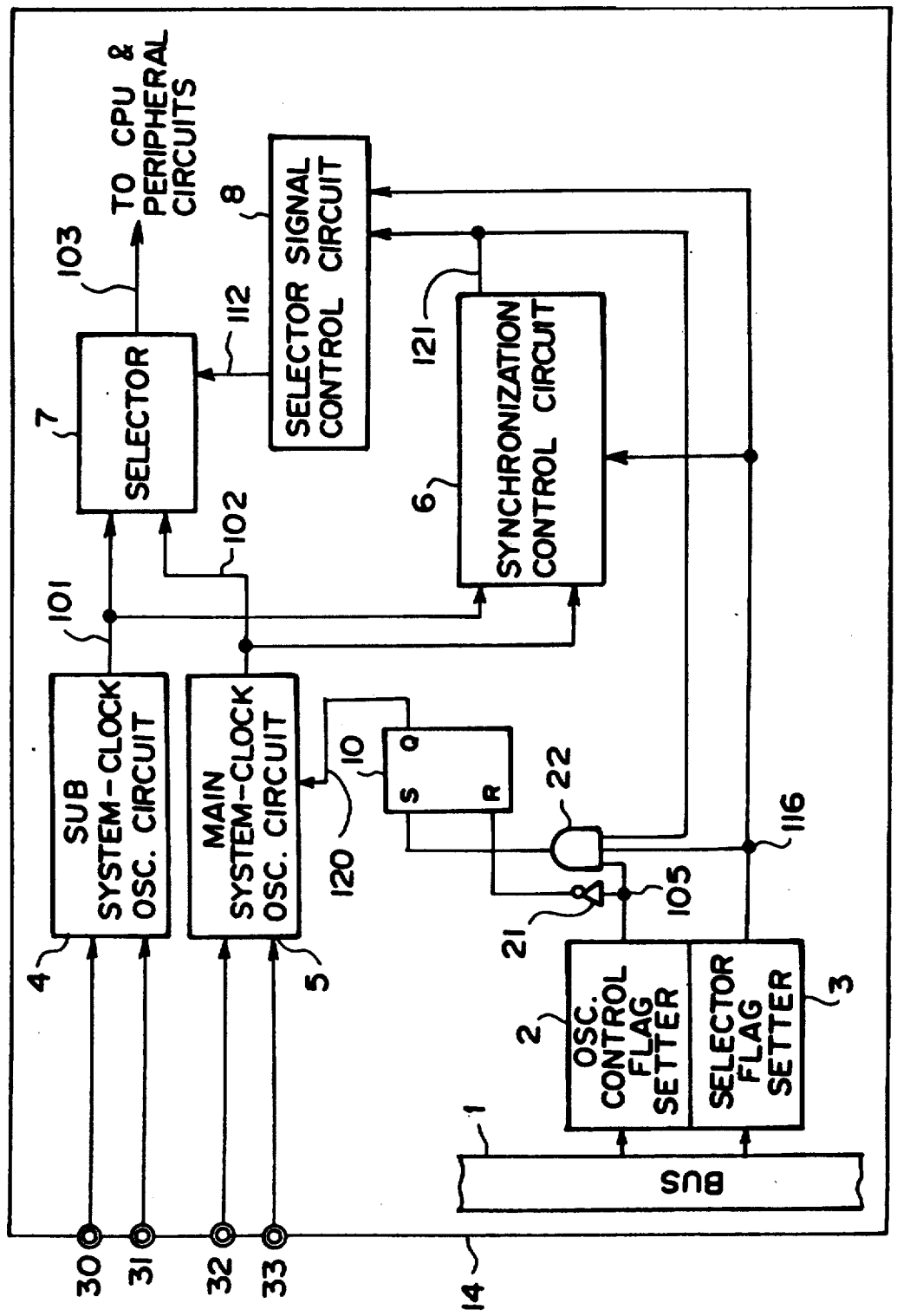
FIG. 1 is a block diagram showing a clock-signal generating circuit in a single-chip microcomputer as a preferred embodiment according to the present invention.

FIG. 1 is a block diagram showing a clock-signal generating circuit 14 in a single-chip microcomputer as an embodiment according to the present invention.

The clock-signal generating circuit 14 shown in FIG. 1 comprises an oscillation control flag setter 2, a selector flag setter 3, a sub system-clock oscillation circuit 4, a main system-clock oscillation circuit 5, a synchronization control circuit 6, a selector signal control circuit 8 and external terminals 30, 31, 32 and 33. A sub clock-signal 101 generated in the sub system-clock oscillation circuit 4 is forwarded to the selector 7 and the synchronization control circuit 6. A main clock-signal 102 generated in the main system-clock oscillation circuit 5 is supplied to the selector 7 and the synchronization control circuit 6. A selector signal 112 is outputted from the selector signal control circuit 8 and supplied to the selector 7. To this extent, the arrangement in FIG. 1 is the same as that of the prior art shown in FIG. 3 and the description of the elements concerned is not repeated here.

However, the configuration shown in FIG. 1 is contrasted to that of the prior art single-chip microcomputer shown in FIG. 3 in that firstly the former includes additionally an SR flip-flop 10, and AND gate 22 and an inverter 21 and secondly includes changes in the oscillation control flag signal 105, the selector flag signal 116, the oscillation control signal 120 and the synchronization signal 121. To a SET input of the SR flip-flop 10 is inputted an output of the AND gate 22 and to a RESET input thereof is inputted an output of the inverter 21. The oscillation control signal 120 is an output of the SR flip-flop 10 which output is supplied to the main system-clock oscillation circuit 5. The oscillation control flag signal 105 is outputted from the oscillation control flag setter 2 and is supplied to the AND gate 22 and the inverter 21. The selector flag signal 116 is outputted from the selector flag setter 3 and supplied to the AND gate 22, the selector signal control circuit 8 and the synchronization control circuit 6. The synchronization signal 121 is an output of the synchronization control circuit 6 and is supplied to the selector signal control circuit 8 and the AND gate 22.

Now, the operation which takes place when the clock-signal 103 is switched from the main clock-signal 102 to the sub clock-signal 101 is explained. First, the CPU 16 executes the instruction for setting "1" in the selector flag setter 3. Under this state, even when "1" is set in the oscillation control flag setter 2, the output of the AND gate 22 is "0". Consequently, the oscillation control signal 120 is "0", so that the main system-clock oscillation circuit 5 continues its oscillating operation. Due to the selector flag setter 3 having been set to "1", the synchronization control circuit 6 starts its operation and, when the main clock-signal 102 and the sub clock-signal 101 synchronize with each other, the synchronization signal 121 rises from "0" to "1". When the selector signal control circuit 8 detects the rise of the synchronizing signal 121, the selector signal 112 is outputted therefrom. Since "1" has been set in the selector flag setter 3, the selector signal 112 turns to "1" accordingly. When the selector signal 112 turns to "1", the selector 7 selects the sub clock-signal 101 whereby the switching is completed. On the other hand, since both the oscillation control flag signal 105 and the selector flag signal 116 are "1", when the synchronization signal 121 rises, an output of the AND gate 22 turns to "1" and the oscillation control signal 120 turns to "1" whereby the main system-clock oscillation circuit 5 stops its oscillating operation. Thus, when the switching from the main clock-signal 102 to the sub clock-signal 101 is completed, the main system-clock oscillation circuit 5 is automatically stopped.

Next, the operation as to how to start the main system-clock oscillation circuit 5 is explained.

The CPU 16 executes the instruction for setting "0" in the oscillation control flag setter 2. When the oscillation control flag is "0", the oscillation flag signal 105 is "0" and the output of the inverter 21 is "1". When "1" is inputted to the RESET input of the SR flip-flop 10, the oscillation control signal 120 turns to "0", so that the main system-clock oscillation circuit 5 starts its oscillating operation. Thus, in effecting the switching from the main clock-signal 102 to the sub clock-signal 101 in the arrangement shown in FIG. 1, it is possible to execute the instruction for stopping the operation of the main system-clock oscillation circuit irrespective of whether or not the clock-signal has been switched to the sub clock-signal and the main system-clock oscillation circuit automatically stops its operation after the clock-signal has been switched to the main clock-signal.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. A single-chip microcomputer provided with a clock-signal generating circuit comprising:

a main system-clock oscillation circuit and a sub system-clock oscillation circuit;

a selector for outputting a clock-signal by making a selection between a main clock-signal which is an output of said main system-clock oscillation circuit and a sub clock-signal which is an output of said sub system-clock oscillation circuit;

a selector flag setter for setting a selector flag signal to designate the selection to be made by said selector;

an oscillation control flag setter for setting an oscillation control flag signal to control the oscillating operation of said main system-clock oscillation circuit;

a synchronization control circuit for making the synchronization between said main clock-signal and said sub clock-signal and outputting a synchronization signal; and a means for taking a logical AND operation of said oscillation control flag signal from said oscillation control flag setter, said selector flag signal from said selector flag setter and said synchronization signal from said synchronization control circuit and outputting an oscillation control signal for stopping the oscillating operation of said main system-clock oscillation circuit.

2. A single-chip microcomputer according to claim 1, in which said means for producing the oscillation control signal comprises a logic circuit formed by an AND gate receiving said oscillation control flag signal, said selector flag signal and said synchronization signal; an inverter receiving said oscillation control flag signal; and an SR flip-flop having a set input receiving an output from said AND gate, a reset input receiving an output from said inverter and an output forwarding out said oscillation control signal to said main system-clock oscillation circuit.

* * * * *